United States Patent
Isshiki et al.

[11] Patent Number: 5,407,260
[45] Date of Patent: Apr. 18, 1995

[54] ANTILOCK BRAKE SYSTEM

[75] Inventors: Isao Isshiki; Hitoshi Hashiba; Yoshiharu Nakai; Seiji Ueda, all of Osaka; Takao Nozaki; Masahide Hio, both of Mie, all of Japan

[73] Assignees: Sumitomo Wiring Systems, Ltd., Mie; Sumitomo Electric Industries, Ltd., Osaka, both of Japan

[21] Appl. No.: 170,901

[22] Filed: Dec. 21, 1993

[30] Foreign Application Priority Data

Dec. 21, 1992 [JP] Japan .................................. 4-356897
Dec. 21, 1992 [JP] Japan .................................. 4-356898

[51] Int. Cl.$^6$ .............................................. B60T 8/00
[52] U.S. Cl. ................................ 303/119.2; 303/113.1; 303/92; 439/34
[58] Field of Search ............... 303/92, 113.1, 119.2, 303/113.2, 119.1, 116.1, 115.1; 439/34, 74, 75, 76, 544, 638, 736; 364/426.01, 426.02, 426.03; 137/884, 596.17, 560; 251/129.01; 361/752, 759, 760

[56] References Cited

U.S. PATENT DOCUMENTS

| | | | |
|---|---|---|---|
| 4,685,753 | 8/1987 | Isshiki et al. | 439/74 |
| 4,697,863 | 10/1987 | Galloway et al. | 439/638 |
| 4,929,038 | 5/1990 | Reinartz et al. | 137/884 |
| 5,022,717 | 6/1991 | Heibel et al. | 303/119.2 |
| 5,040,853 | 8/1991 | Burgdorf et al. | 303/119.2 |
| 5,127,440 | 7/1992 | Mass et al. | 137/884 |
| 5,137,455 | 8/1992 | Moerbe et al. | 439/34 |
| 5,275,478 | 1/1994 | Schmitt et al. | 303/119.2 |
| 5,288,141 | 2/1994 | Isshiki et al. | 303/119.1 |

FOREIGN PATENT DOCUMENTS

| | | | |
|---|---|---|---|
| 373551 | 6/1990 | European Pat. Off. | |
| 499670 | 8/1992 | European Pat. Off. | 303/119.2 |
| 519736 | 12/1992 | European Pat. Off. | 303/119.2 |
| 8910805 | 1/1991 | Germany . | |
| 4133879 | 4/1993 | Germany . | |
| 2225168 | 5/1990 | United Kingdom | 303/119.2 |
| 92/12878 | 8/1992 | WIPO | 303/119.2 |

*Primary Examiner*—Douglas C. Butler
*Attorney, Agent, or Firm*—Sughrue, Mion, Zinn, Macpeak & Seas

[57] ABSTRACT

A hydraulic power unit (5) mounts integrally an electronic unit (6) in an antilock brake system. The unit (5) has a solenoid tab (5ab) containing a coupling pin connected to a coil of a solenoid valve (5a). The electronic unit (6) has a connector for a power source, a motor relay (7), terminal sections (61Ba, 61Bd, and 61Be) for fail-safe relays. The coil in the solenoid valve (5a) is electrically coupled to an electronic control section, and the terminal sections (61Bd and 61Be) in the electronic unit (6) by coupling the solenoid tab 5ba to a solenoid socket (14) in the electronic unit (6). This construction makes it easy to electrically interconnect the coil of the solenoid valve in the hydraulic power unit (5) and the electronic unit (6).

8 Claims, 9 Drawing Sheets

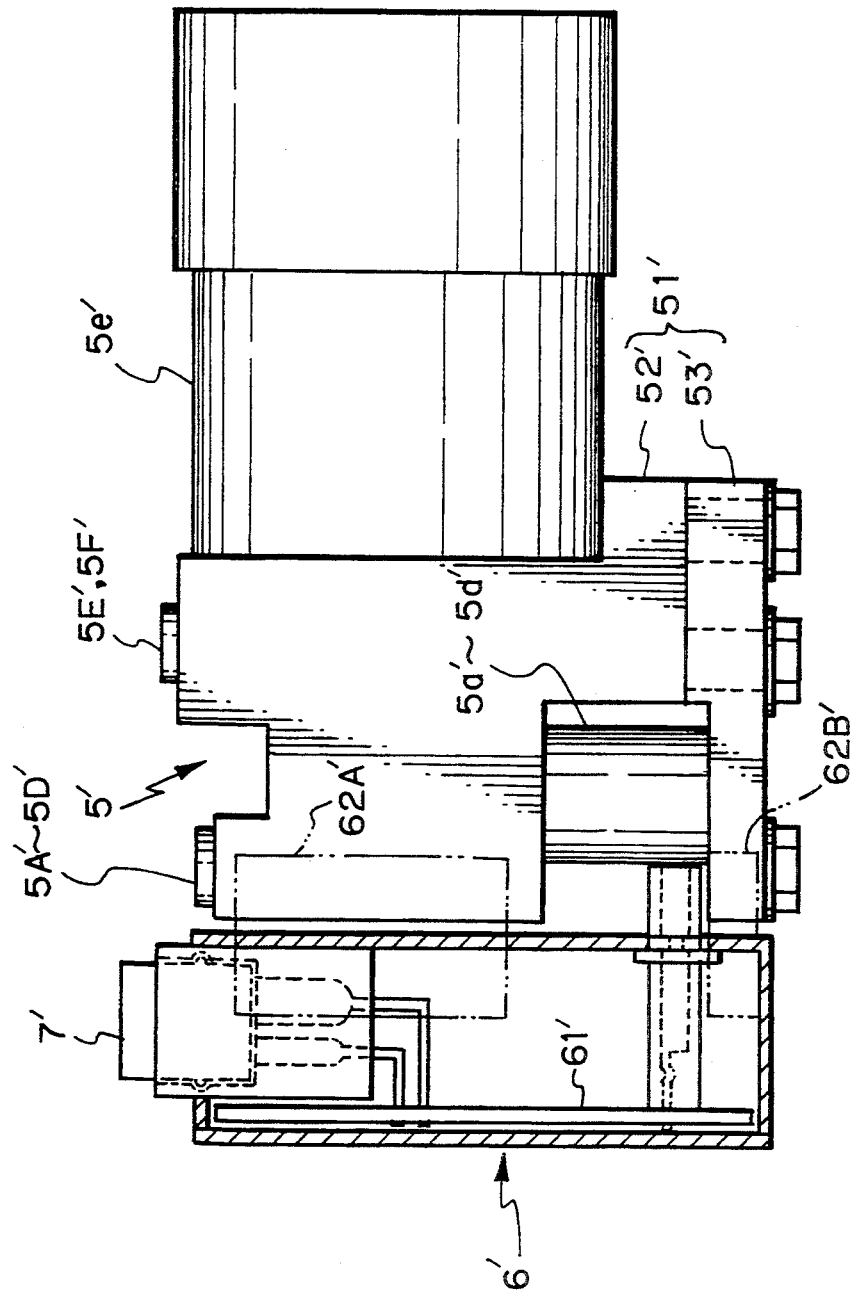

ANTILOCK BRAKE SYSTEM

BACKGROUND OF THE INVENTION

1. Field of the Invention

This invention relates to an antilock brake system in an automobile which prevents wheels from becoming locked upon emergency braking or when braking on a slippery road by adjusting a pressure of a brake fluid, and more particularly to a hydraulic power unit integrally mounting an electronic unit containing an electronic control section in the antilock brake system.

2. Statement of the Prior Art

There is known an antilock brake system which prevents the wheels in an automobile from being locked during emergency braking or braking on a slippery road, as a system for enhancing the safety of an automobile. Recently, automobiles provided with such an antilock brake system have become common place.

For convenience of explanation, a conventional antilock brake system will be described below by referring to FIGS. 10 and 11. FIG. 10 is a schematic explanatory view of the prior antilock brake system in the automobile and FIG. 11 is a diagram showing the electrical system of the antilock brake system.

As shown in FIGS. 10 and 11, a conventional antilock brake system comprises rotation detectors 1 to 4, a hydraulic power unit 195, an electronic control section 106 and a relaybox 107.

The rotation detectors 1 to 4 are provided on wheels A to D respectively to detect a rotating condition thereof. The rotation detectors 1 to 4 are provided with 1a to 4a and sensor rotors 1b to 4b, respectively. The sensors 1a to 4a are made of, for example, a permanent magnet, a coil, or a pole piece. The sensor is attached to a steering knuckle at the front wheel and to a hub spindle at the rear wheel. On the other hand, each of the sensor rotors 1b to 4b is provided on the outer periphery with serrations (not shown) formed uniformly along the peripheral direction. The sensor rotor is attached to a drive shaft at the front wheel and to a rear hub at the rear wheel. Accordingly, sensor rotors 1b to 4b rotate together with the wheels A to D, respectively. The sensors 1a to 4a detect the rotating condition of the wheels A to D by sensing the serrations on the outer periphery of the sensor rotors 1b to 4b during their rotations. The rotation detectors 1 to 4 transmit detecting signals from the sensors 1a to 4a to an electronic control section 106 to be described hereinafter.

The hydraulic power unit 105 is provided with four solenoid valves 105a to 105d for corresponding wheels. The hydraulic power unit 105 controls on-off operations of the solenoid valves 105a to 105d in accordance with control signals from the electronic control section 106, thereby controlling the pressure of a brake fluid supplied to wheel cylinders of the wheels A to D.

The electronic control section 106 receives the detecting signals from the rotation detectors 1 to 4 and monitors whether or not there is any wheel in a direction to be locked when it is braked in accordance with the detecting signal. The electronic control section 106 is made of a printed circuit plate. In the case that there is a wheel in the direction to be locked, the electronic control section 106 controls the hydraulic power unit 105 so that the pressure of brake fluid supplied to the wheel cylinder of the corresponding wheel is decreased. In the case that possible locking of the corresponding wheel is avoided, the pressure of brake fluid is increased again.

A relay box 107 contains motor and fail-safe relays 107a and 107b which amplify the control signal from the electronic control section 106 and applies the amplified control signal to the hydraulic power unit 105.

In FIG. 11, 108 is a battery for an automobile as a power source for the antilock brake system, 109 an ignition switch, 110 a stop lamp switch disposed in the vicinity of a brake pedal, 111 a stop lamp constituting a part of a rear lamp, 112 a warning lamp for indicating an abnormal state in the antilock brake system and 113 a diode for lighting the warning lamp 112 when the connector of the electronic control section is in a disengaged position or the fail-safe relay 107b is turned off.

In the prior antilock brake system, the hydraulic power unit 105 and relay box 107 are disposed in an engine compartment as shown in FIG. 10. On the contrary, the electronic control section 106 is generally disposed in a car interior such as a space under a seat or within front panel. The rotation detectors 1 to 4 are provided on the wheel sections as described before.

In modern automobiles, the number of electronic control sections is increasing in keeping with an increase in performance while at the same time, maintaining the interior of cars as spacious as possible is desirable. However, providing the electronic control section 106 in a car interior requires long wire harnesses to connect the rotation detectors 1 to 4 in the engine compartment to section 108.

Further, since the hydraulic power unit 105 in the engine compartment is provided separate from the electronic control section 106 in the car interior in the prior system, it is necessary to provide wire harnesses which electrically interconnect them as well. This lowers the efficiency of automobile production. In particular, since modern automobiles are provided with many systems which have not been provided in the conventional automobile, as well as antilocking braking systems, the number of wiring steps has increased and harness design has become very complicated. Accordingly, decreasing the number of wiring steps is desirable in order to simplify automobile production.

SUMMARY OF THE INVENTION

An object of this invention is to provide an antilock brake system which does not take up excessive space in a car interior and which simplifies harness design by integrally mounting an electronic control section on a hydraulic power unit in an engine compartment.

Another object of this invention is to provide an antilock brake system which can easily connect a coil of a solenoid valve in a hydraulic power unit to an electronic control section and/or an electronic element in an electronic unit.

In order to achieve the above object or objects, an antilock brake system of the present invention comprises:

a rotation detector for detecting a rotating condition of each wheel of an automobile;

a hydraulic power unit having coupling ports for brake fluid pipes and for controlling a pressure of a brake fluid in a wheel cylinder of each wheel by controlling an on-off operation of a solenoid valve in each wheel by means of an electrical control signal;

an electronic control section for generating said control signal which controls said pressure of said brake fluid so that a wheel is not locked in response to a detecting signal from said rotation detector; and motor and fail-safe relays for supplying an electrical power to said hydraulic power unit in response to said control signal from said electronic control section;

said hydraulic power unit having coupling portions for said solenoid valves including contact pieces connected to coils of said solenoid valves;

said electronic control section being disposed on an electronic unit having coupling portions for receiving other electronic elements to be electrically connected to said electronic control section, and solenoid sockets adapted to be coupled to said coupling portions for the solenoid valves and including contact pieces to be electrically connected to said electronic control section and/or said electronic elements;

said electronic unit being integrally secured to said hydraulic power unit;

said coupling portions for the solenoid valves being coupled to said solenoid sockets.

In the antilock brake system of the present invention, said electronic unit may be integrally coupled to said hydraulic power unit at a position contacting with a plane exclusive of the plane provided with said coupling ports in said hydraulic power unit, thereby making the shortest distance between said electronic unit and said hydraulic power unit.

In the antilock brake system of the present invention, the solenoid socket of the electronic unit is coupled to the coupling portion for the solenoid valve of the hydraulic power unit upon coupling integrally the electronic unit including the electronic control section to the hydraulic power unit. That is, when the electronic power unit including the electronic control section is integrally coupled to the hydraulic power unit, an electrical connection between the coil of the solenoid valve and the electronic control section and/or the electronic element in the electronic unit is automatically effected.

In the antilock brake system of the present invention, said motor of said hydraulic power unit has coupling portions for the motor including contact pieces connected to a coil inside the motor. Said electric control section is disposed on an electronic unit having coupling portions for receiving another electric elements to be electrically connected to said electronic control section. A motor socket is adapted to be coupled to said coupling portions for the motor and including contact pieces to be electrically connected to said motor relay which is mounted on the electronic control section. Said electronic unit is integrally secured to said hydraulic power unit. Said coupling portions for the motor is coupled to said motor socket.

Also, in the antilock brake system since the electronic unit is contact with the plane exclusive of the plane provided with the coupling ports in the hydraulic power unit and the electronic element is connected to the electronic control section through the coupling portion of the electronic power unit, it is not necessary to dispose in the car interior parts which constitute the antilock brake system. Accordingly, it is not necessary to provide any wire harness extending between the engine compartment and the car interior in order to interconnect the electronic control section and the hydraulic power unit. Further, it is possible to make the shortest distance between the electronic unit and the hydraulic power unit by integrally coupling the electronic unit to the hydraulic power unit at the position contacting with the plane exclusive of the plane provided with the coupling ports in the hydraulic power unit.

BRIEF DESCRIPTION OF THE DRAWINGS

FIG. 7 is a side view of another embodiment of the antilock brake system of the present invention;

DETAILED DESCRIPTION OF THE PREFERRED EMBODIMENTS

Referring now to FIGS. 1 to 8, an embodiment of the antilock brake system of the present invention and in particular a hydraulic power unit integrally provided with an electronic unit will be described below.

Figure 6:
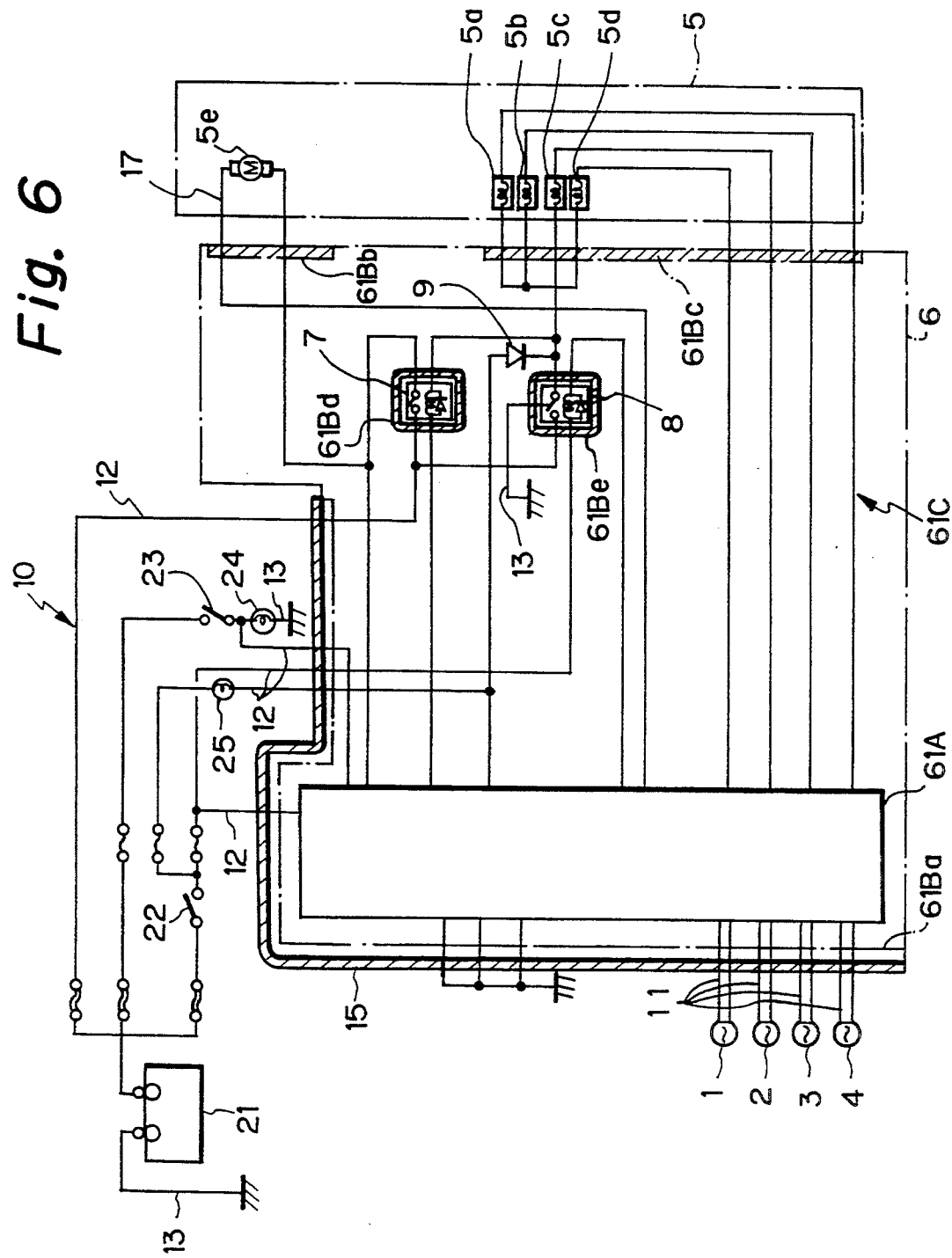
FIG. 6 is an electrical diagram of the antilock brake system.
Figure 10:
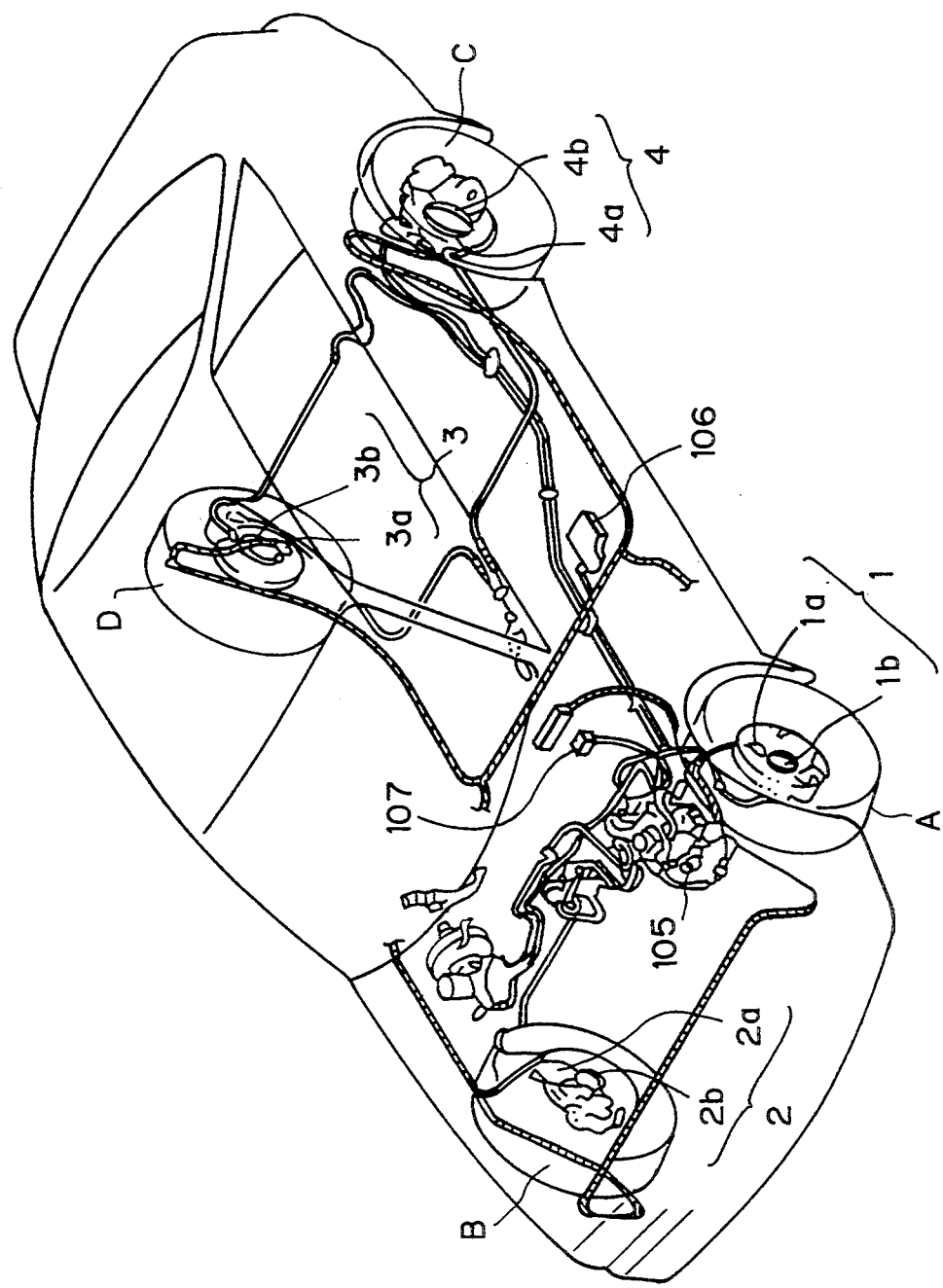
FIG. 10 is an explanatory view of a prior antilock brake system.

The antilock brake system of the present invention shown in FIG. 6 has the same electrical construction and operation as those of the conventional antilock brake system shown in FIG. 10. That is, the antilock brake system of the present invention includes rotation detectors 1 to 4, a hydraulic power unit 5, an electronic unit 6 having an electronic control section 61A, a motor relay 7, a fail-safe relay 8, and a diode 9.

In FIG. 6, 21 is a car battery, 22 an ignition switch, 23 a stop lamp switch disposed near a brake pedal, 24 a stop lamp constituting a part of rear lamps, and 25 a warning lamp indicating an abnormal state in the antilock brake system. A power source section 10 including the battery 21 through the warning lamp 25 is connected to the electronic unit 6 through power source lines 12. The power source lines and earth lines 13 to be connected to earth terminals (not shown) together with signal supplying lines connected to the rotation detectors 1 to 4 described hereinafter constitute a wire harness. A connector 15 is coupled to an end of the wire harness.

Figure 11:
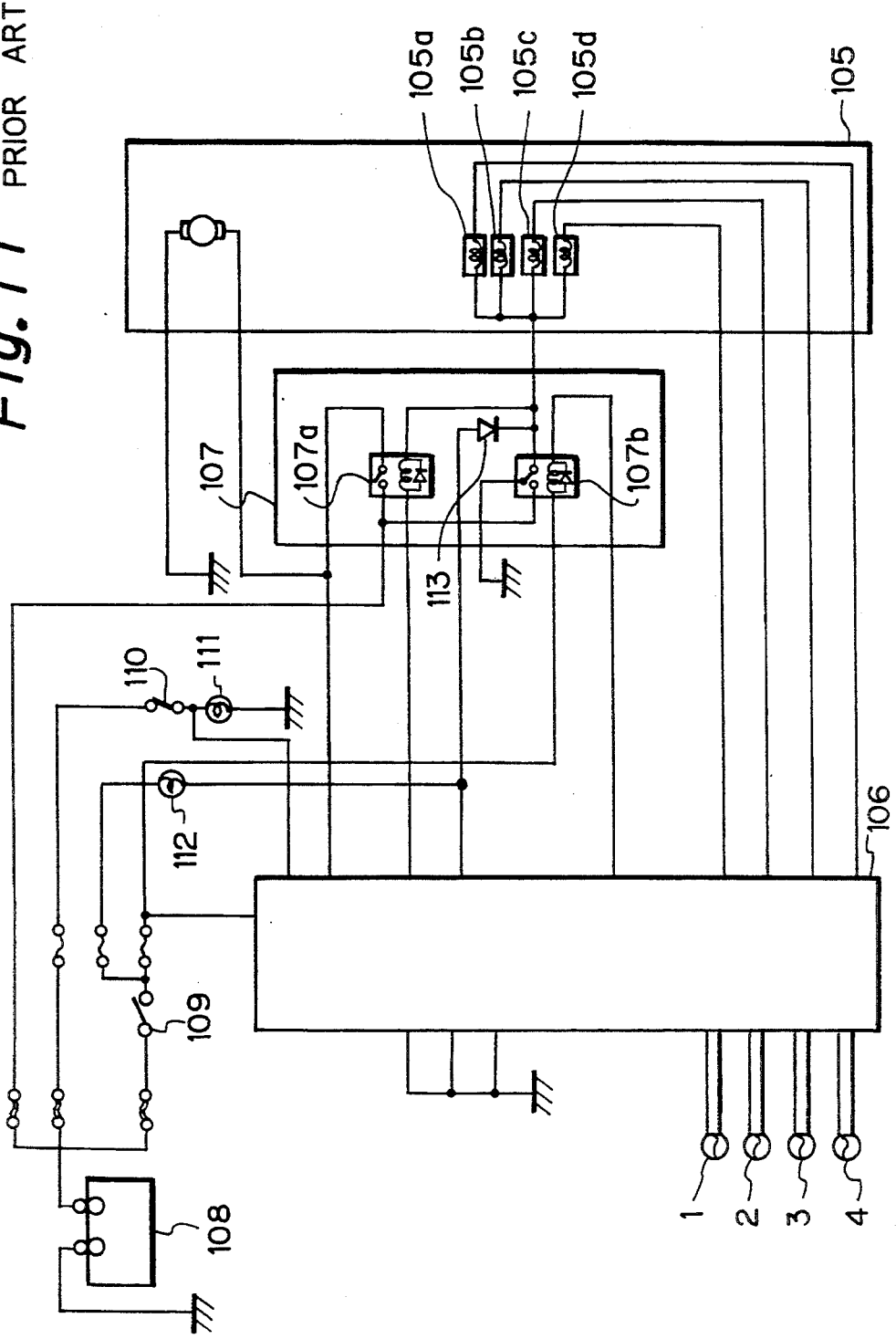
FIG. 11 is an electrical diagram of the prior antilock brake system.

The rotation detectors 1 to 4 are the same as the prior rotation detectors 1 to 4 shown in FIGS. 10 and 11. The rotation detectors 1 to 4 comprises sensors 1a to 4a and sensor rotors 1b to 4b. The rotation detectors 1 to 4 detect the rotating conditions of the respective wheels of the automobile and send detecting signals through the signal supplying lines 11 to the electronic control section 61A described hereinafter.

Figure 1:
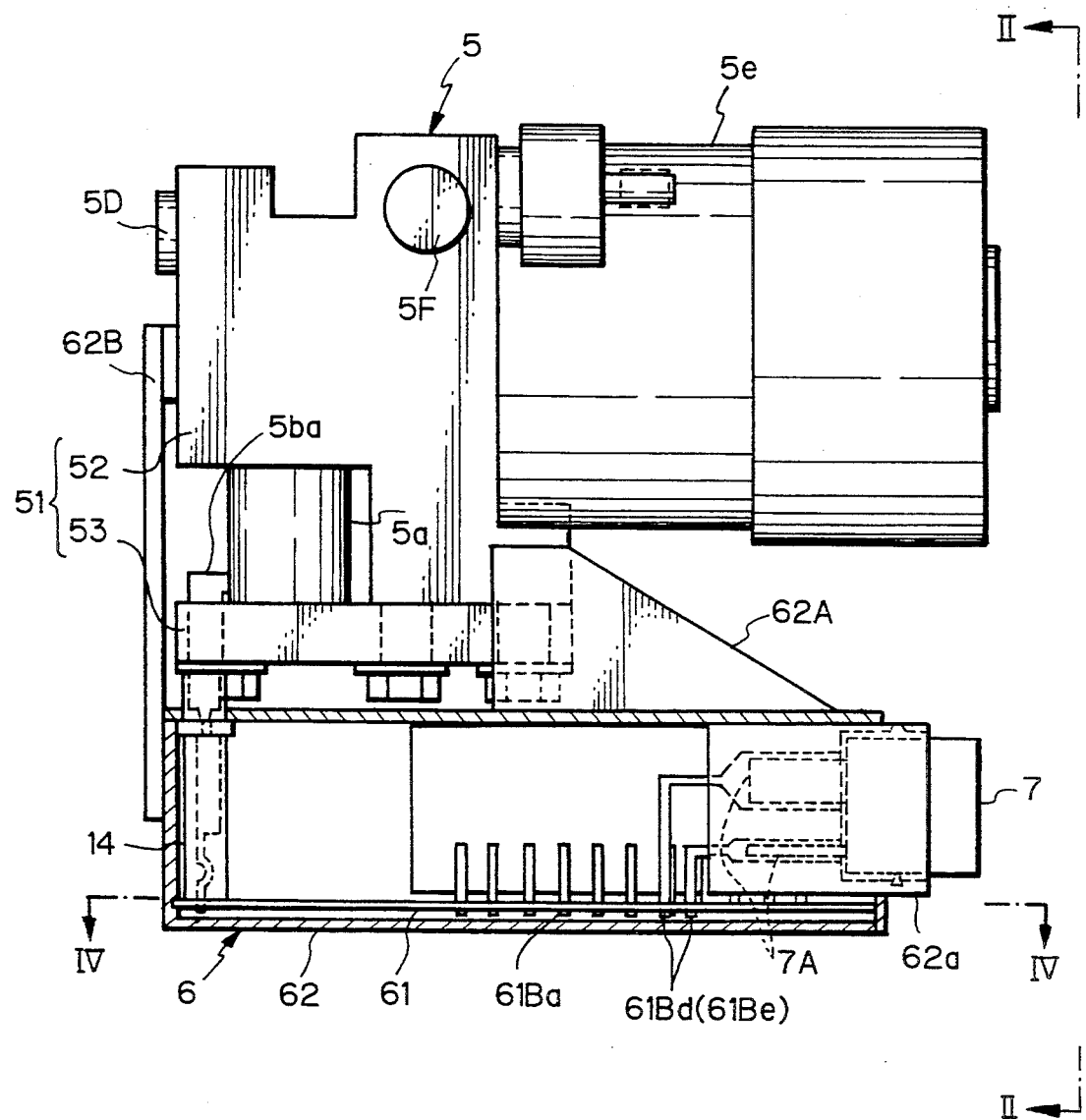
FIG. 1 is a side view of an antilock brake system of the present invention.
Figure 2:
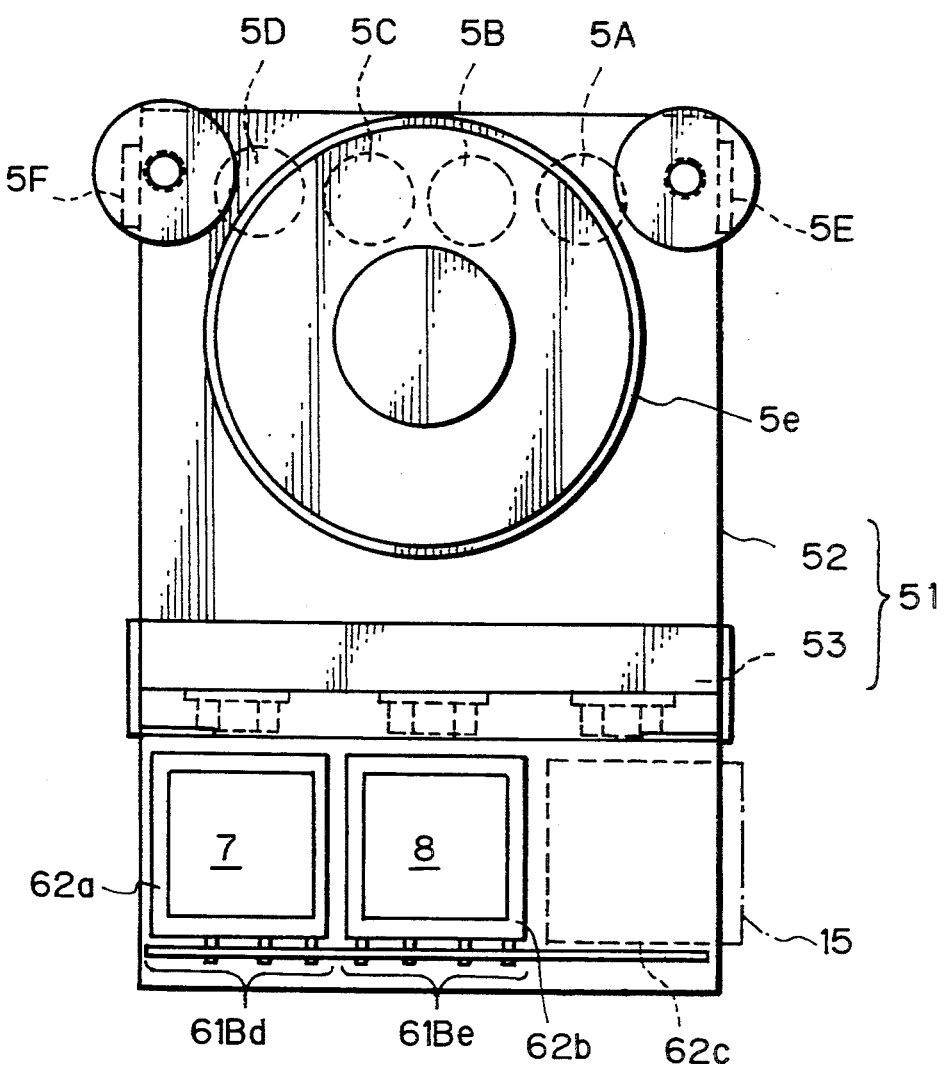
FIG. 2 is a rear view taken along lines II—II in FIG. 1.

FIGS. 1 and 2 show a hydraulic power unit integrally mounting the electronic unit of the present invention in which the hydraulic power unit 5, the electronic unit 6, the motor relay 7, and the fail-safe relay 8 are integrally assembled in the antilock brake system shown in FIG. 6. This assembly is disposed in the engine compartment in the automobile.

The hydraulic power unit 5 controls a pressure of brake fluid to a wheel cylinder by controlling an ON-OFF operation of each of four solenoid valves 5a to 5d. The ON-OFF operations of the respective solenoid valves 5a to 5d is controlled in accordance with a controlling signal from the electronic control section 61A. Means for supplying an electrical power to coils of the respective solenoid valves 5a to 5d will be described hereinafter. The hydraulic power unit 5 has a motor 5e which drives a pump (not shown) so as to flow the brake fluid to a master cylinder (not shown). The electrical power can be supplied to the motor 5e by connecting a lead line of the motor 5e (described below) to a terminal section 6b of the electronic unit 6.

Figure 5:
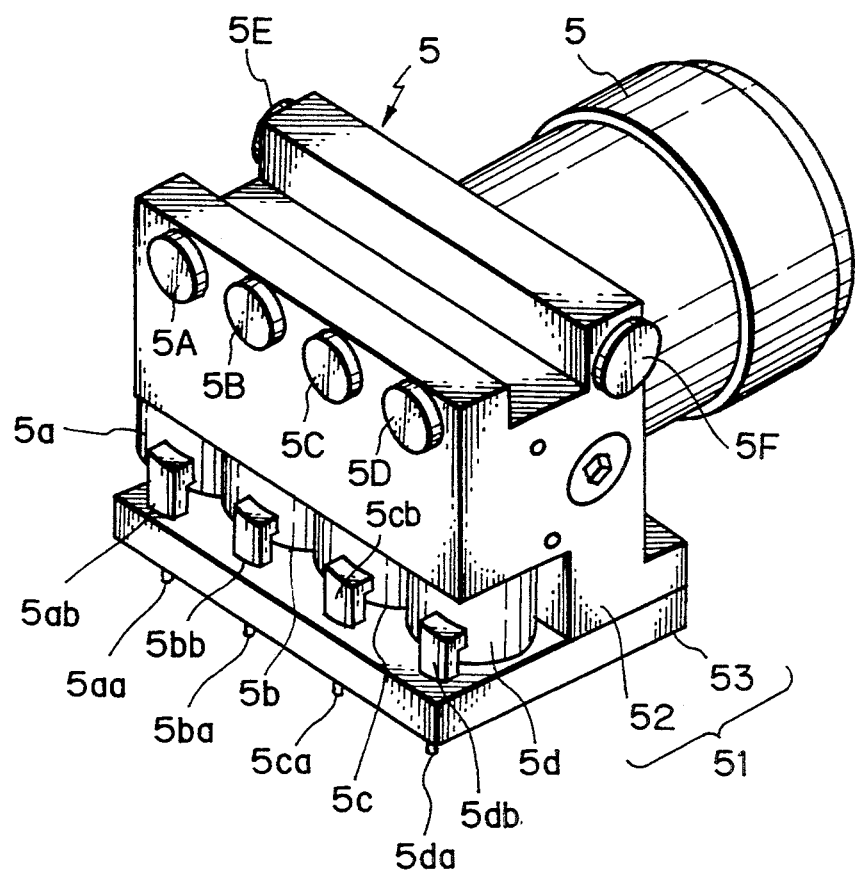
FIG. 5 is a perspective view of a hydraulic power unit.

As shown in FIG. 5, a housing 51 of the hydraulic power unit 5 has a housing body 52 and a bottom plate 53.

The housing body 52 contains the pump, flow control valves or brake fluid flow paths (not shown) adapted to be actuated in connection with ON-OFF operations of the respective solenoid valves 5a to 5d, and the like therein. The housing body 52 is provided on a front face with coupling ports 5A to 5D for the brake fluid to the respective cylinders (not shown) and on a side face with coupling ports 5E ad 5F for the brake fluid to the respective brake master cylinders (not shown). Further, the housing body 52 is provided on a rear face with the motor 5e.

The bottom plate 53 supports the solenoid valves 5a to 5d between the housing body 52 and the plate 53. Connecting pins 5aa to 5da which apply a voltage to the respective coils of the solenoid valves 5a to 5d are secured to the bottom plate 53.

Figure 3:
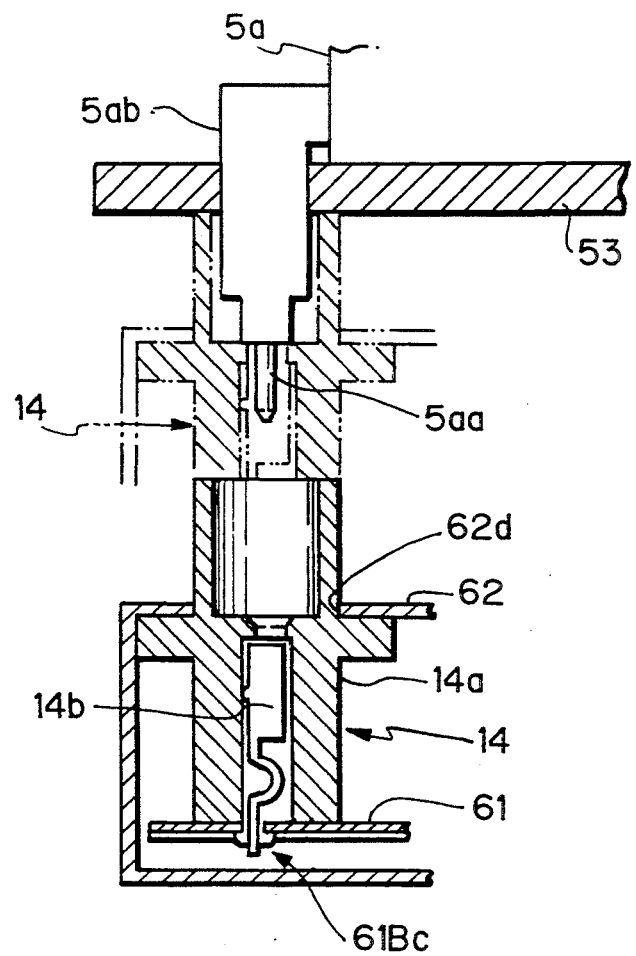
FIG. 3 is an enlarged sectional view of a main part of FIG. 1.

The connecting pins 5aa to 5da (5aa is shown in FIG. 3 on behalf of them) except top ends thereof are embedded in solenoid tabs 5ab to 5db formed integrally in a resin cover section molding the solenoid valves 5a to 5d. The connecting pins 5aa to 5da together with the solenoid tabs 5ab to 5db extend downwardly through the bottom plate 53 in the vicinity of an end portion of the hydraulic power unit 5.

The electronic unit 6, as shown in FIG. 1, has a printed circuit plate 61 and a housing 62. The electronic unit 6 has the same length or less than that of the entire length of the hydraulic power unit 5.

The printed circuit plate 61 is provided with the electronic control section 61A, terminal sections 61Ba to 61Be, and a wiring section 61C in the antilock brake system shown in FIG. 6.

The electronic unit section 61A is constructed and operates in the same manner as the electronic unit 106 in the prior antilock brake system. That is, the electronic control section 61A calculates a wheel velocity and wheel acceleration and deceleration and conjecture a car body velocity in accordance with the detecting signals from the respective rotation detectors 1 to 4. If it is decided that there is a wheel in the locking direction upon braking the respective wheels, the electronic control section 61A controls the respective solenoid valves 5a to 5d of the hydraulic power unit 5 so as to reduce the pressure of brake fluid to the wheel cylinder of the corresponding wheel. On the other hand, if it is decided that the wheel to which the pressure of brake fluid has been reduced will not be locked the electronic control unit 61A controls the ON-OFF operations of the solenoid valves 5a to 5d so as to increase the pressure of brake fluid again.

Figure 4:
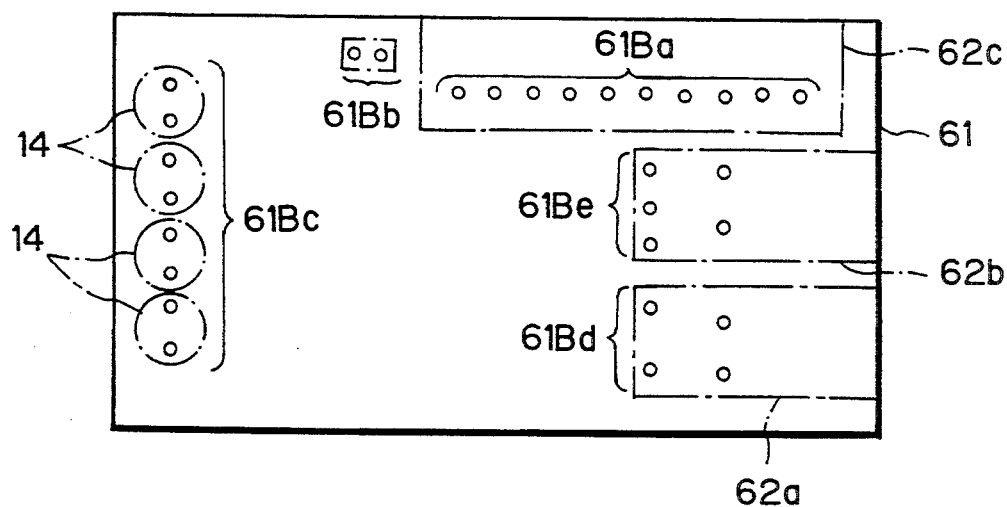
FIG. 4 is a plan view taken along lines IV—IV in FIG. 1, which illustrates an arrangement of terminal sections on a printed circuit plate.

Terminal sections 61Ba to 61Be are arranged on the printed circuit plate 61, for example, as shown in FIG. 4.

The terminal section 61Ba connects the signal supplying lines 11, electric power lines 12 and earth lines 13 to the electronic unit 6. Each terminal constituting the terminal section 61Ba is a pin which stands on the printed circuit plate 61. The terminal correspond to a connector socket 62c in the housing 62, which is described hereinafter.

The terminal section 61Bb connects a lead line 173 for supplying an electrical power to the motor 5e in the hydraulic power unit 5 to the electronic unit 6. The terminal section 61Bb is formed on a printed wiring section on the printed circuit plate 61.

The terminal section 61Bc connects the solenoid valves 5a to 5d in the hydraulic power unit 5 to the electronic unit 6. The terminal section 61Bc is formed on the printed wiring section on the printed circuit plate 61. Each of the terminal in the terminal section 61Bc corresponding to the solenoid valves 5a to 5d is associated with a solenoid socket 14 described hereinafter.

The terminal section 61Bd connects a motor relay 7 described hereinafter to the electronic unit 6. Each terminal constituting the terminal section 61Bd is a pin which stands on the printed circuit plate 61. The terminal is associated with a socket 62a described later.

The terminal section 61Be connects a fail-safe relay 8 described later to the electronic unit 6. Each terminal constituting the terminal section 61Be is a pin which stands on the printed circuit plate 61. The terminal is associated with a socket 62b of the housing 62 described later.

The wiring section 61C interconnects the electronic control section 61A and terminal sections 61Ba to 61Be.

The housing 62 is made of aluminum and is coupled to the housing 51 of the hydraulic power unit 5 through attaching brackets 62A and 62B. The printed circuit plate 61 is horizontally disposed in the housing 62.

Sockets 62a and 62b made of resin are embedded in a rear wall of the housing 62 so that they receive the motor relay 7 and fail-safe relay 8. The socket 62a is associated with the terminal section 61Bd while the socket 62b is associated with the terminal section 61Be.

Further, the connector socket 62c is embedded in a side wall of the housing 62 so that the socket 62c receives the connector 15. The connector socket 62c is associated with the terminal section 61Ba.

As shown in FIG. 3, connecting pin passing-through portions 62d are formed in an upper wall of the housing 62 in opposition to the solenoid tabs 5ab to 5db of the hydraulic power unit 5 so that the tabs 5ab to 5db are inserted into the portion 62d. The solenoid sockets 14 are provided between the passing-through portion 62d and the terminal section 61Bc on the printed circuit plate 61 in association with the respective solenoid valves 5a to 5d (only one solenoid socket 14 associated with the solenoid valve 5a is shown in FIG. 3).

As shown in FIG. 3, the solenoid socket 14 has a resin body 14a and a connecting terminal 14b secured in the resin body 14a. The connecting terminal 14b is soldered to a connecting portion 61Bc on the printed circuit plate 61 at a lower end thereof. The respective connecting pins 5aa to 5da can be inserted downwardly into upper portions of the connecting terminals 14b. The upper portions are provided with elastic contact pieces (not shown) which contact elastically with the inserted connecting pins 5aa to 5da.

The motor relay 7 serves to amplify a control signal from the electronic control section 6 so as to switch the motor 5e on or off. The motor relay 7 has a terminal 7A, which is electrically connected to the pin terminal constituting the terminal section 61Bd when the motor relay 7 is mounted on the socket 62a in the housing 62.

The fail-safe relay 8 serves to shut off an electric power to the respective solenoid valves 5a to 5d of the hydraulic power unit 5 in the case that an abnormal state occurs in the antilock brake system. The fail-safe relay 8 has the same terminal as the terminal 7A of the motor relay 7. This terminal is electrically connected to the pin terminal constituting the terminal section 61Be when the fail-safe relay 8 is mounted on the socket 62b in the housing 62.

The diode 9 is connected between lower streams of the warning lamp 25 and the contact of the fail-safe relay 8 so that the diode 9 lights the warning lamp 25 when the fail-safe relay 8 is turned off. In the electronic unit 6, the diode 9 is connected to a terminal portion (not shown) on the wiring section 61C of the printed circuit plate 61 by means of soldering or the like, so that the diode 9 is disposed between the given terminals of the electronic control section 61A and the terminal section 61Be.

In the assembly of the electronic unit and the hydraulic power unit in the antilock brake system, the electronic unit 6 is coupled to the hydraulic power unit 5 and they are integrally interconnected by the attaching bracket 62A and 62B while the respective tabs 5ab to 5db of the solenoid valves 5a to 5d are inserted into the corresponding solenoid sockets 14. The coils of the solenoid valves 5a to 5d are connected to the terminal section 61Bc of the electronic unit 6 when the electronic unit 6 is coupled to the hydraulic power unit 5.

Then, the lead line of the motor 5e is connected to the terminal section 61Bb of the electronic unit 6, the motor relay 7 and the fail-safe relay 8 are mounted on the sockets 62a and 62b, and the connector 15 is coupled to the connector socket 62c. Thus, a circuit for the antilock brake system shown in FIG. 6 is constructed.

The assembly of the electronic unit and the hydraulic power unit is disposed at the same position as the hydraulic power unit 105 in the prior antilock brake system shown in FIG. 10.

In the antilock brake system with the above assembly, it is not necessary to provide a wire harness extending between the engine compartment and the car interior in order to interconnect the hydraulic power unit 5 and the electronic unit 6 even if the antilock brake system is provided in the automobile.

Also, in the present antilock brake system, it is possible to readily connect the coils of the solenoid valves 5a to 5d to the electronic control section 61A or the motor relay 7 and fail-safe relay 8 by integrally coupling the electronic unit 6 to the hydraulic power unit 6 while coupling the solenoid tabs 5ab to 5ad of the hydraulic power unit 5 to the solenoid sockets 14 of the electronic unit 6. Consequently, it is possible to omit a process of connecting the elements individually.

In addition, in the present antilock brake system, the relays 7 and 8 are connected to the terminal sections 61Bd and 61Be of the electronic unit 6 by mounting the relays 7 and 8 on the sockets 62a and 62b in the housing 62 of the electronic unit 6. Accordingly, it is not necessary to interconnect the relays 7 and 8 the hydraulic power unit 5 or relays 7 and 8 and the electronic control section 61A on the printed circuit by wire harness as carried out in the prior system. This can simplify wire-harness design.

In the present assembly, since the electronic unit 6 is coupled to the bottom face of the hydraulic power unit 5, on which the coupling ports 5A to 5F are not provided, the electronic unit 6 does not block an arrangement of pipes for brake fluid to the hydraulic power unit 5.

Although the electronic control unit 61A and the wiring section 61C are formed on a single sheet of printed circuit plate 61 in the above embodiment, only the electronic control section 61A may be formed on the printed circuit plate and the wiring section 61C may be formed of a wire harness or may be formed into an arrangement in which each bus bar is disposed between a plurality of insulators spaced in a given distance in the assembly of the present invention. In this case, it is possible to form in the wiring section a connecting portion to be connected to a terminal of an electrical element such as the printed circuit plate, the relays 7, 8, the connector 15, or the like by bending an end of the bus bar.

FIG. 7 shows an assembly of the electronic unit and hydraulic power unit in another antilock brake system. In FIG. 7, parts corresponding to those in FIG. 1 are indicated by dashed signs "_'".

In the antilock brake system shown in FIG. 7, coupling ports 5A' to 5F' are provided on an upper face of a hydraulic power unit 5' while an electronic unit 6' is integrally coupled to a front face of the hydraulic power unit 5'. The hydraulic power unit 5' and electronic unit 6' are coupled with each other through attaching brackets 62A' and 62B'.

Figure 8:
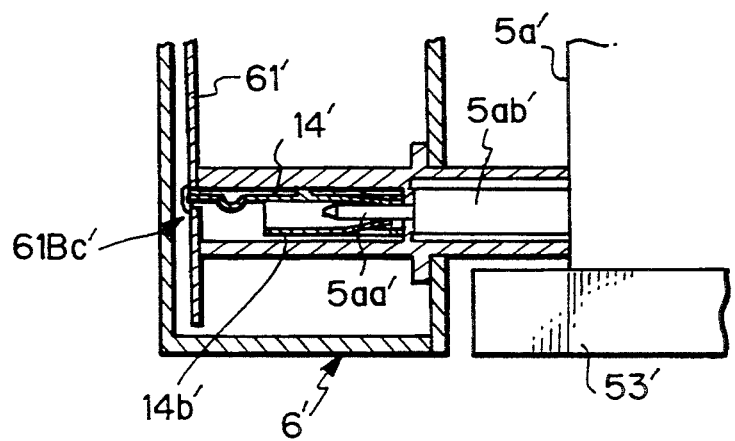
FIG. 8 is an enlarged sectional view of a main part of FIG. 3.

In the hydraulic power unit 5', connecting pins coupled to the coils of the solenoid valves 5a' to 5d' project forward by from the hydraulic power unit 5' in the same manner as the connecting pin 5aa' shown in FIG. 8. The connecting pin 5aa' except it's distal end is inserted into or molded in a solenoid tab 5ab'.

The electronic unit 6' has a printed circuit plate 61' corresponding to the printed circuit plate 61, which is disposed vertically in a housing 62'. The electronic unit 6' is provided at a lower portion with a solenoid socket 14' corresponding to the solenoid socket 14. The solenoid tab 5ab is inserted into the solenoid socket 14'. The connecting pin 5aa' is electrically connected to a terminal section 61Bc' of the printed circuit plate 61' through a connecting terminal 14b' in the solenoid socket 14'.

Although only the solenoid valves 5a' is explained, the other solenoid valves 5b' to 5d' have the same construction as the solenoid valve 5a'.

Figure 9:
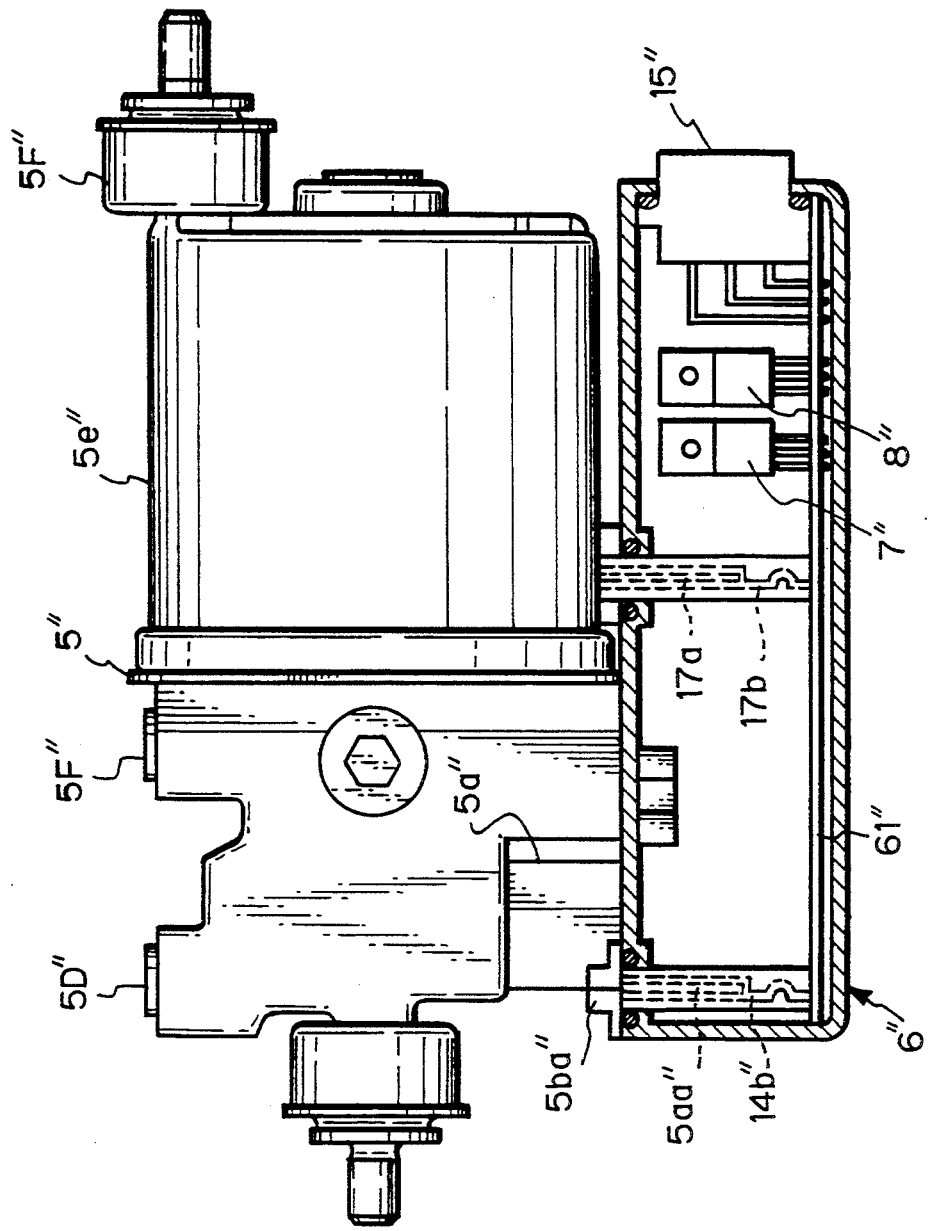
FIG. 9 is a side view of still another embodiment of the antilock brake system of the present invention.

FIG. 9 shows an assembly of the electronic unit and hydraulic power unit in another antilock brake system. In FIG. 9, ports corresponding to those in FIG. 1 are indicated by double dashed signs "_'"".

In the antilock brake system shown in FIG. 9, coupling ports 5A" to 5F" are provided on an upper or a front face of a hydraulic power unit 5" while an electronic unit 6" is integrally coupled to an under face of the hydraulic power unit 5". In the hydraulic power unit 5", connecting pins coupled to the coil inside the motor 5e" protect downward by from the hydraulic power unit 5" in the same manner as the connecting pin 5aa shown in FIG. 3. The electronic unit 6" has a printed circuit plate 61″ corresponding to the printed circuit plate 61 and also has motor socket 17b″ which mounted on the printed circuit. The motor tab 17a″ is inserted into the motor socket 17b″. The connecting pin 17a″ is connected to a motor relay 7″ via the printed circuit plate 61″.

Also in this embodiment, mechanical relays are replaced with solid state relays 7″, 8″. Only motor connecting is explained, solenoid valves 5a″ to 5d″ have the same construction as FIG. 1 described before.

According to the antilock brake system of the present invention, since the electronic unit containing the electronic control section is disposed in the engine compartment, it is not necessary to dispose member constituting the antilock brake system in the car interior and it is possible to eliminate a limitation which impedes to widen a space in the car compartment even if the antilock brake system is provided in the automobile. It is also possible for the same reason to eliminate a wire harness for the antilock brake system which extends between the engine compartment and the car interior and to simplify a process of wire-harnessing and to enhance a production efficiency.

Further, the present invention facilitates forming the antilock brake system since the electrical connection between the coils of the solenoid valves in the hydraulic power unit and the electronic control section and/or the electronic element can be effected by coupling the solenoid socket to the connecting section for the solenoid valves upon interconnecting the hydraulic power unit and the electronic unit.

Also, the electronic unit does not block the arrangement of pipes for brake fluid to the coupling ports in the hydraulic power unit since the electronic unit is integrally coupled to the hydraulic power unit at the position adjoining the face provided with no coupling port.

What is claimed is:

1. An antilock brake system comprising:
    a rotation detector for detecting a rotating condition of each wheel of an automobile;
    a hydraulic power unit having coupling ports for brake fluid pipes and for controlling a pressure of brake fluid in a wheel cylinder of each said wheel by controlling an on-off operation of a plurality of solenoid valves, at least one solenoid valve in each said wheel, by means of an electrical control signal;
    an electronic control section for generating said control signal which controls said pressure of brake fluid so that the wheel is not locked in response to a detecting signal from said rotation detector; and
    motor and fail-safe relays for supplying an electrical power to said hydraulic power unit in response to said control signal from said electronic control section;
    said hydraulic power unit having coupling portions for said solenoid valves including first contact pieces connected to coils of said solenoid valves;
    said electronic control section being disposed on an electronic unit having coupling portions for receiving other electronic elements to be electrically connected to said electronic control section, and solenoid sockets coupling said coupling portions for the solenoid valves and including second contact pieces electrically connected to said electronic control section;
    said electronic unit being directly coupled to said hydraulic power unit to form a unitary assembly.

2. An antilock brake system according to claim 1, wherein said electronic unit is directly coupled to said hydraulic power unit at a position contacting with a plane except the plane provided with said coupling ports in said hydraulic power unit to form said unitary assembly, thereby minimizing the distance between said electronic unit and said hydraulic power unit.

3. An antilock brake system according to claim 1, said motor of said hydraulic power unit having coupling portions for the motor including third contact pieces connected to a coil inside the motor;
    said electric control section being disposed on an electronic unit having coupling portions for receiving other electronic elements to be electrically connected to said electronic control section,
    and a motor socket coupled to said coupling portions for the motor and including contact pieces to be electrically connected to said motor relay which is mounted on the electronic control section;
    said electronic unit coupled directly to said hydraulic power unit to form said unitary assembly;
    said coupling portions for the motor being coupled to said motor socket.

4. An antilock brake system according to claim 1, said electronic unit being directly coupled to said hydraulic power unit by an attaching means.

5. An antilock brake system according to claim 4, wherein said attaching means comprises brackets.

6. An antilock brake system according to claim 1, wherein said coils of said solenoid valves are connected to a terminal section when said electronic unit is directly coupled to said hydraulic power unit.

7. An antilock brake system according to claim 1, wherein said hydraulic power unit, said electronic control section, and said motor and fail-safe relays are directly coupled to each other to form said unitary assembly.

8. An antilock brake system according to claim 7, wherein said motor and fail-safe relays are connected to terminal sections of said electronic unit by mounting said motor and fail-safe relays on said solenoid sockets in said electronic unit.

* * * * *